(12) United States Patent
Dantele

(10) Patent No.: US 7,484,813 B2
(45) Date of Patent: Feb. 3, 2009

(54) AXLE JOURNAL MOUNTED TO AXLE TUBE AND METHOD OF ASSEMBLY

(75) Inventor: Johann Dantele, Schwebheim (DE)

(73) Assignee: Otto Sauer Achsenfabrik Keilberg, Bessenbach-Keilberg (DE)

( * ) Notice: Subject to any disclaimer, the term of this patent is extended or adjusted under 35 U.S.C. 154(b) by 146 days.

(21) Appl. No.: 10/496,121

(22) PCT Filed: Nov. 29, 2002

(86) PCT No.: PCT/EP02/13469

§ 371 (c)(1),
(2), (4) Date: May 25, 2005

(87) PCT Pub. No.: WO03/047884

PCT Pub. Date: Jun. 12, 2003

(65) Prior Publication Data

US 2005/0212352 A1    Sep. 29, 2005

(30) Foreign Application Priority Data

Dec. 4, 2001  (DE) ............................ 201 19 641 U

(51) Int. Cl.
*B60B 35/00* (2006.01)

(52) U.S. Cl. .................... 301/132; 301/124.1

(58) Field of Classification Search ............. 301/124.1, 301/130, 131, 132, 134, 135, 137; 403/297, 403/374.1, 374.3, 374.4
See application file for complete search history.

(56) References Cited

U.S. PATENT DOCUMENTS

| 868,101 | A | * | 10/1907 | Kuhs et al. ................ 279/59 |
| 1,139,182 | A | * | 5/1915 | Henthorn et al. ............. 301/130 |
| 1,400,385 | A | * | 12/1921 | Stewart ..................... 301/135 |
| 1,463,824 | A | * | 8/1923 | Leuvelink ................... 220/236 |
| 1,611,453 | A | * | 12/1926 | Johnson .................. 280/93.512 |
| 1,953,636 | A | * | 4/1934 | Skelton ....................... 16/30 |
| 2,370,773 | A | * | 3/1945 | Bradley ..................... 301/132 |
| 4,150,736 | A | * | 4/1979 | Marti ........................ 188/332 |
| 4,270,434 | A | * | 6/1981 | Bucheli ...................... 411/21 |

(Continued)

FOREIGN PATENT DOCUMENTS

GB    2 271 824    4/1994

*Primary Examiner*—Russell D Stormer
(74) *Attorney, Agent, or Firm*—Wenderoth, Lind & Ponack, L.L.P.

(57) ABSTRACT

The invention concerns a method for mounting a wheel on an axle housing in the form of an axle tube (1) for vehicles, in particular commercial vehicles, whereby the wheel is fixed e.g. with wheel bolts to a wheel hub, rotating on the axle journal (2) of the axle tube (1). The axle journal (2) is clamped on to an end section (3) of the axle tube (1) as a separate component. For simplicity of manufacture and assembly combined with functional durability it is proposed that the end section (3) of the axle tube (1) is cylindrical on the inside and that the axle stub (2) fits into the end section (3) of the axle tube (1) with an externally corresponding cylindrical connecting section (5). Further, the end section (3) of the axle tube (1) is radially clamped on to the connecting section (5) of the axle stub (2) by at least one clamping piece (6) that is adjustable in an axial direction to the end (12) of the axle tube (1) by a threaded bolt (8).

18 Claims, 3 Drawing Sheets

U.S. PATENT DOCUMENTS

| | | | |
|---|---|---|---|
| 4,486,052 A * | 12/1984 | Taggart, Jr. | 301/130 |
| 5,281,005 A | 1/1994 | Schlosser et al. | |
| 5,538,330 A * | 7/1996 | Ehrlich | 301/124.1 |
| 5,897,268 A * | 4/1999 | Deville | 403/109.5 |
| 6,039,497 A * | 3/2000 | Gullberg | 403/16 |
| 6,641,229 B1 * | 11/2003 | Kosak | 301/132 |
| 6,935,646 B2 * | 8/2005 | Inoue et al. | 280/124.106 |
| 6,969,211 B2 * | 11/2005 | Altman | 403/374.4 |
| 7,197,806 B2 * | 4/2007 | Boudreaux et al. | 29/434 |
| 7,260,879 B2 * | 8/2007 | Koschinat | 29/525.11 |
| 2006/0001312 A1 * | 1/2006 | MacKarvich | 301/124.1 |

\* cited by examiner

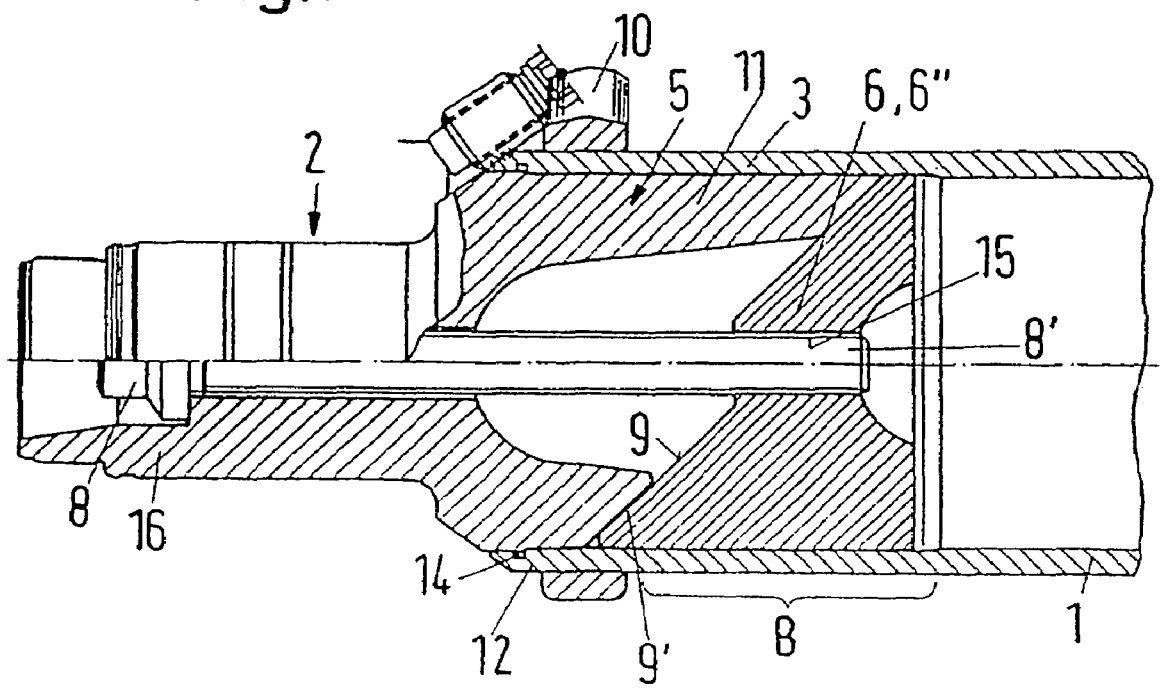
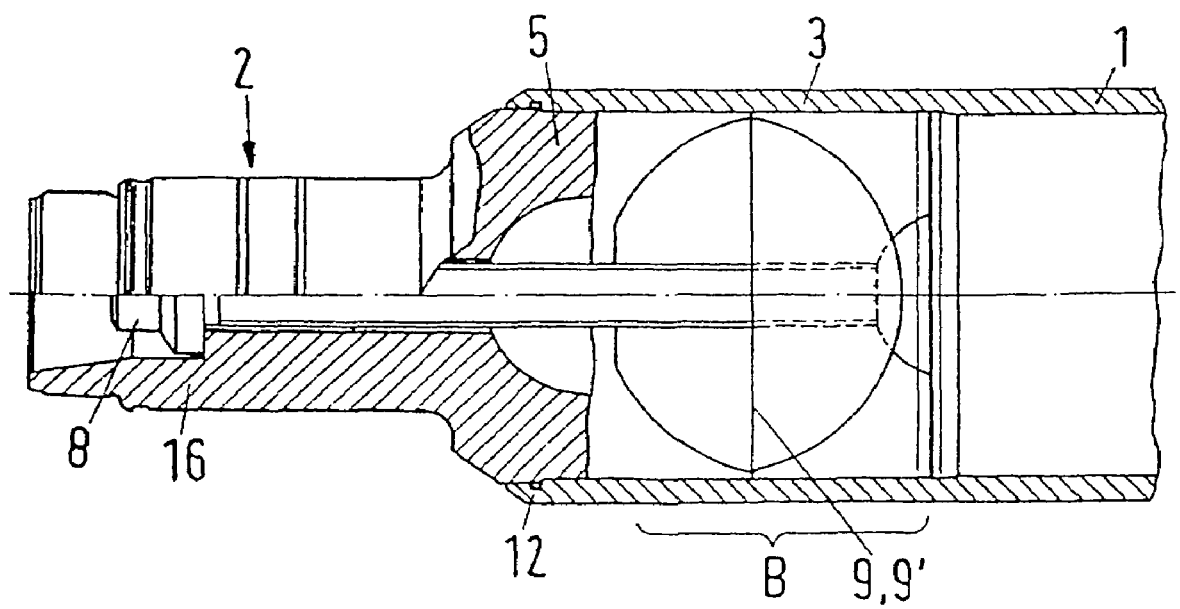

US 7,484,813 B2

AXLE JOURNAL MOUNTED TO AXLE TUBE AND METHOD OF ASSEMBLY

BACKGROUND OF THE INVENTION

The invention relates to a wheel bearing on an axle housing in the form of an axle tube for vehicles, in particular commercial vehicles, in which the wheel is fixed, for example, with wheel bolts, to a wheel hub, which is rotatable on the axle journal of the axle tube. The axle journal is clamped, as a separate component, on to an end section of the axle tube.

For passenger vehicles, a method is known whereby the axle journal is connected to the axle housing by means of flange connections. The purpose thereof is to shift the interface between the wheel, wheel hub and axle housing, i.e. at the wheel bearing, to a location between the axle journal and the axle housing so that if the brake disc needs replacement, the mounting of the wheel, i.e. the wheel bearing, is not affected, because it never needs to be taken out. However, such flange connections are not suitable for the absorption of the considerable forces encountered in commercial vehicles.

It has therefore already been proposed to provide the separate axle journal with a conical connecting section which is clamped by means of an axial screw into an inner cone of the end section which opens towards the axle end. However, this wheel bearing requires considerable manufacturing and assembly effort and can, moreover, lead to an undesired expansion of the end section of the axle tube.

SUMMARY OF THE INVENTION

This invention therefore proposes a wheel bearing of the type described which is simple both from a manufacturing and assembly aspect and at the same time functionally durable.

According to the invention, the end section of the axle tube has a cylindrical inner surface and the axle journal fits into the end section of the axle tube with an externally corresponding cylindrical connecting section. The end section of the axle tube is radially clamped on to the connecting section of the axle journal by means of at least one clamping piece, which can be adjusted in the axial direction relative to the end of the axle tube by means of a threaded bolt.

In this manner, the clamping forces are transferred from the connecting section of the axle journal to the end section of the axle tube over a large surface so that even in the case of low clamping forces there is a very secure connection between the axle journal and axle tube. Moreover, the assembly and disassembly of such a wheel bearing can be carried out easily and quickly.

In one embodiment, the clamping piece may be in the form of a clamping cone which cooperates with an interior conical surface of the connecting section of the axle journal that opens towards the opposite end of the axle tube.

In an alternative embodiment, the clamping piece may take the form of a clamping wedge which cooperates with an inclined surface of the connecting section of the axle journal that is oriented towards the opposite end of the axle tube.

To facilitate the expansion of the connecting section of the axle journal, the wall of the connecting section forming the internal conical surface may feature at least one basically parallel axis expansion slit which is open at the inside end of the connecting section. This slit preferably tapers from the inside end of the connecting section towards the end of the axle journal. In this embodiment, the clamping piece may be of cruciform design with arms that engage the tapering expansion slit(s). As the clamping piece is being tensioned, the cross arms push progressively deeper into the expansion slits causing expansion of the connecting section of the axle journal and clamping thereof on to the axle tube.

The outside circumference of the cross arms of the clamping body preferably have a substantially cylindrical outer configuration thus allowing the member to be guided on the inner cylindrical surface of the end section of the axle tube.

The bracing of the clamping body on the connecting section can easily be achieved by threading a section of the axially threaded bolt to an internally threaded section of the clamping piece. The threaded bolt rotates on the axle journal to prevent co-rotation of the clamping piece.

In order to ensure clamping of the connecting section of the axle journal to the end section of the axle tube over a large area, the clamping piece acts on the end section of the axle tube in an area away from the brake bracket. To avoid undesired expansion of the axle tube towards its end, the area away from the brake bracket of the end section of the axle tube should be located on the side of the brake bracket opposite the end of the axle tube.

It is advantageous to reinforce the axle tube area away from the brake bracket against the rest of the axle tube to ensure secure absorption of the radial expansion forces.

Further aims, features, advantages and applications of the invention are evident from the following description of embodiments with reference to the drawings. All features described and/or pictorially represented, alone or in any combination form the subject of the invention.

BRIEF DESCRIPTIONS OF THE DRAWINGS

FIG. 7 shows another embodiment of a wheel bearing according to the present invention in a representation according to FIG. 1.

FIG. 8 shows the embodiment shown in FIG. 7 (without brake bracket) in another sectional plane.

DETAILED DESCRIPTION OF THE INVENTION

Figure 1:
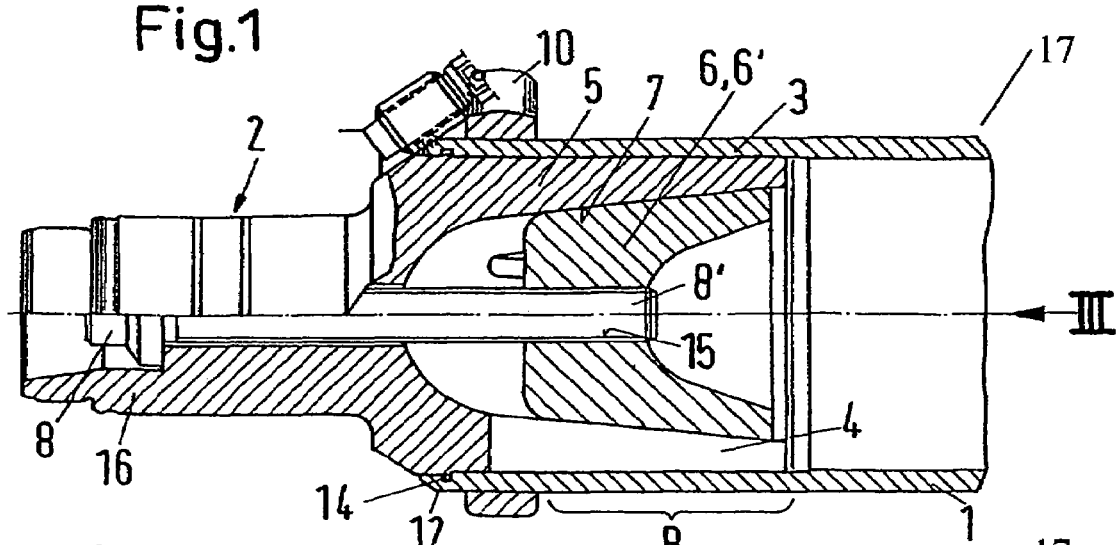
FIG. 1 shows a partial section and broken away view of an embodiment of a wheel bearing according to the present invention.
Figure 2:
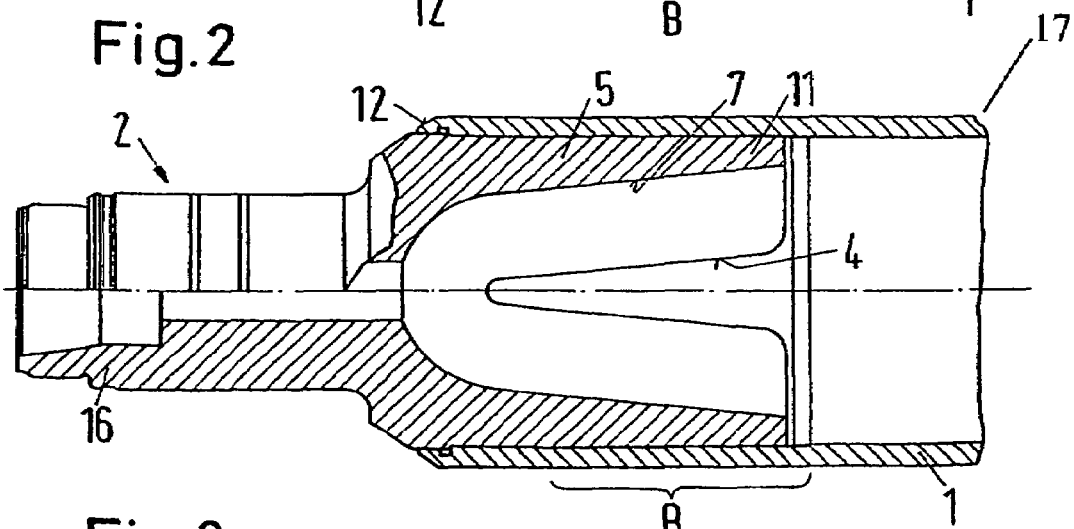
FIG. 2 shows the wheel bearing of the embodiment shown in FIG. 1 (without brake bracket), in which the clamping body and threaded bolt have been omitted.
Figure 3:
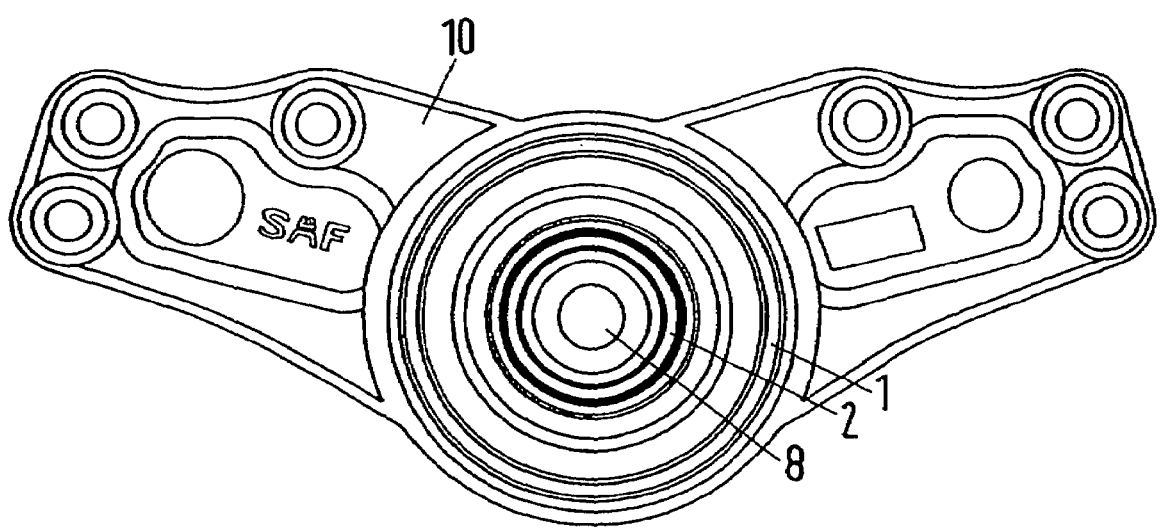
FIG. 3 shows an end view of the embodiment shown in FIG. 1 from direction III in which the brake bracket is shown in its position on the axle tube.

As shown in FIGS. 1-3, a wheel bearing according to the present invention is provided on an axle housing in the form of an axle tube 1 for vehicles, particularly commercial vehicles. With such a wheel bearing, the wheel (not shown) is attached, for example, by means of wheel bolts (also not shown) to a wheel hub (not shown) which is rotatably mounted on the axle journal 2 of the axle tube 1. The axle journal 2 is radially clamped on to the end section 3 of the axle tube 1 as a separate component. For this purpose, the inside of the end section 3 of the axle tube 1 is cylindrical. The axle journal 2 fits into the end section 3 of the axle tube 1 with an externally cylindrical connecting section 5. An O-ring 14 is disposed between the connecting section 5 and the axial tube 1.

The end section 3 of the axle tube 1 is radially clamped on to the connecting section 5 of the axle journal stub 2 by means of at least one clamping piece 6 that is adjustable in an axial direction relative to the first end 12 of the axle tube 1 by means of a threaded bolt 8. The clamping piece 6 is in the form of a clamping cone 6', which cooperates with an interior conical surface 7 of the connecting section 5 of the axle journal 2 that opens towards the mid-section 17 of the axle tube 1. The wall 11 of the connecting section forming the internal conical surface 7 features at least one expansion slit 4 which extends substantially parallel to the axis and is open at the inside end of the connecting section 5. The slit(s) 4 taper(s) from the inside end of the connecting section towards the end 12 of the axle tube 1.

Bracing of the clamping piece 6 relative to the connecting section 5 and thus of the connecting section 5 relative to the end section 3 of the axle tube 1 occurs in that a threaded section 8' of the axial threaded bolt 8 engages an internal thread 15 of the clamping piece 6. The axial threaded bolt rotates on the axle journal 2.

If several expansion slits 4 are provided, they are preferably evenly distributed over the circumference of the wall 11 of the connecting section 5 of the axle stub 2. As shown in FIG. 1, the clamping piece 6 acts on the end section 3 of the axle tube 1 in an area away from the brake bracket 10 so that a frictional connection is established over a large area, yet at the same time an undesired expansion of the end 12 of the axle tube 1 is prevented. It is advantageous to secure the clamping piece 6, 6' against rotation relative to the axle journal 2, e.g. by a local elevation projecting into one of the expansion slits 4.

Figure 4:
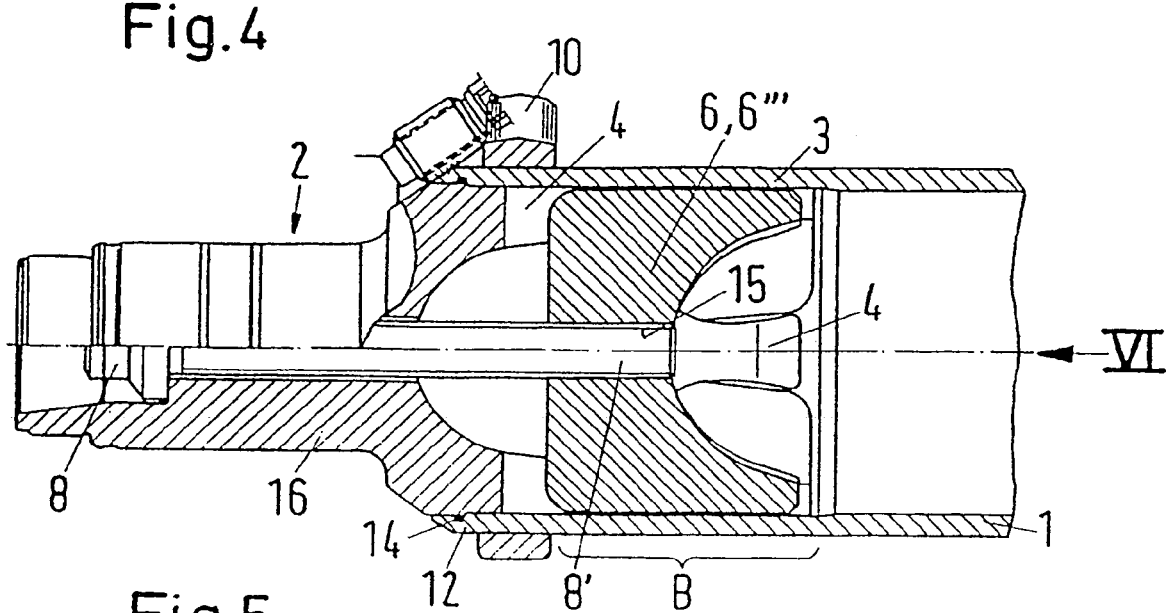
FIG. 4 shows a representation, as per FIG. 1, of a partial section and broken away view of another embodiment of a wheel bearing according to the present invention.
Figure 5:
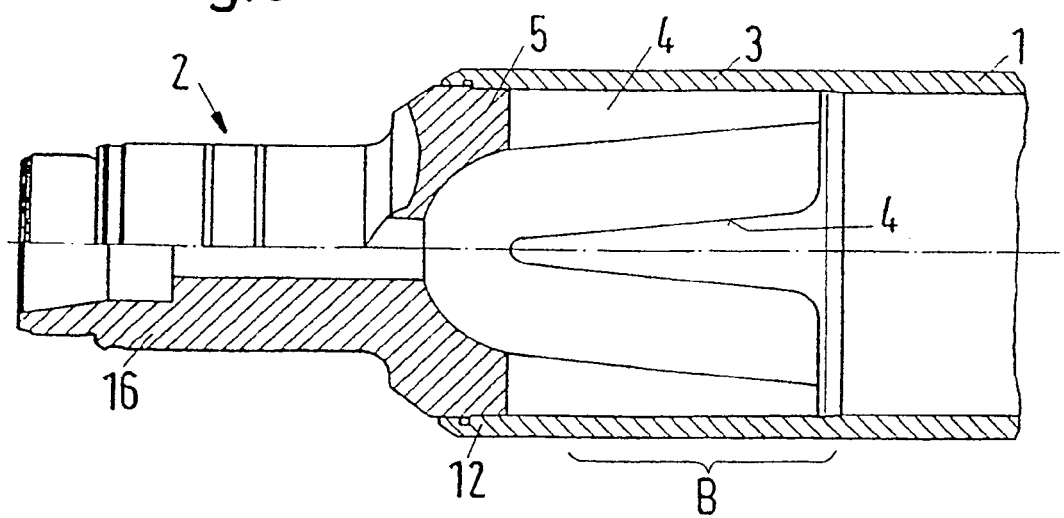
FIG. 5 shows a representation, as per FIG. 2, of the embodiment shown in FIG. 4.
Figure 6:
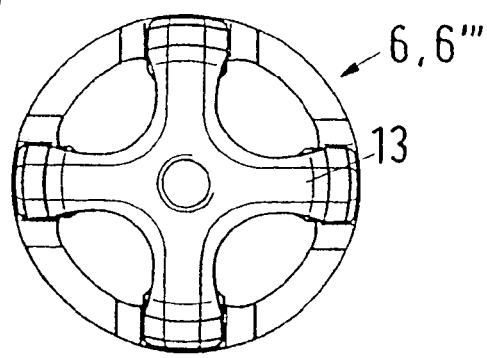
FIG. 6 shows an end view of the clamping piece taking the form of a cruciform member from direction VI in FIG. 4.

In the embodiment shown in FIGS. 4-6, the clamping piece 6 is designed as a cross-shaped body 6''' whose cross arms 13 engage the expansion slits 4 that taper towards the end 12 of the axle tube 1. As its cross arms 13 define an essentially cylindrical outside circumference, the cross-shaped body 6''' can be guided on the inner cylindrical surface of the axle tube 1. When the cross-shaped body 6''' is braced with the aid of the threaded bolt 8, the cross arms move progressively further into the expansion slits 4 that taper into the direction of movement so that expansion of the connecting section 5 occurs.

In the additional embodiment of the invention shown in FIGS. 7 and 8, the clamping piece 6 is designed as a clamping wedge 6'' which cooperates with an inclined surface 9, 9' of the connecting section 5 of the axle journal 2 that is oriented towards the opposite end of the axle tube. Here there is no need for expansion slits 4 in the wall 11 of the connecting section 5. When tensioning i.e. actuating the threaded bolt 8, the connecting section 5 and the clamping wedge 6'' interlock within the axle tube 1 to form a secure but detachable connection of the axle journal 2 with the axle tube 1 even with the strong forces that occur in commercial vehicles.

According to the present invention when a brake disc needs to be replaced, it is only necessary to detach the axle journal 2 from the axle tube 1 without interfering with the wheel bearing (not shown) positioned on the axle pin 16 of the axle journal 2 projecting from the axle tube 1.

LIST OF REFERENCE NUMBERS

1 Axle tube
2 Axle stub
3 End section of axle tube 1
4 Expansion slit
5 Connecting section
6, 6', 6'', 6''' Clamping piece, clamping cone, clamping wedge, cross-shaped body
7 Internal conical surface
8, 8' Threaded bolt, threaded section
9, 9' Inclined surfaces
10 Brake bracket
11 Wall
12 End of axle tube 1
13 Cross-arms
14 O-ring
15 Internal thread
16 Axle pin

The invention claimed is:

1. A method of assembling a wheel mounting structure for a vehicle which has a wheel fixed to a wheel hub which rotates on a separate axle journal connected to the axle tube, the method comprising:
   forming the axle tube to have a first end and a mid-section, the first end including an end portion with an inner cylindrical surface, and forming the axle journal to have a connecting section with an outer cylindrical surface which corresponds to the inner cylindrical surface of the end portion of the axle tube;
   fitting the connecting section into the end portion of the axle tube such that the outer cylindrical surface of the connecting section engages the inner cylindrical surface of the end portion of the axle tube; and
   radially bracing the connecting section against the end portion of the axle tube with a clamping piece and a bolt by using the bolt to adjust the clamping piece in an axial direction with respect to the axle tube to thereby move the clamping piece relative to the axle journal and the end portion;
   wherein said forming the axle tube includes forming a brake anchor plate and mounting the brake anchor plate to the axle tube at the first end thereof, and said forming the axle journal includes configuring the connecting section to be radially braced against the axle journal at a position between the brake anchor plate and the mid-section of the axle tube.

2. The method according to claim 1, wherein said forming the axle journal includes forming the axle journal to be an integrated, one-piece unit.

3. The method according to claim 1, wherein said forming the axle tube includes configuring the inner surface of the end portion of the axle tube to define a circular cylinder having a uniform cross-section along the longitudinal axis thereof.

4. The method according to claim 1, wherein said forming the axle journal includes configuring the outer surface of the connecting section to define a circular cylinder having a uniform cross-section along the longitudinal axis thereof.

5. The method according to claim 1, wherein said forming the axle journal includes configuring the connecting section of the axle journal to have an inner conical surface which opens towards the mid-section of the axle tube when the connecting section is engaged to the inner surface of the end portion of the axle tube, and further comprising providing the clamping piece with an outer conical surface for engaging the inner conical surface of the connecting section.

6. The method according to claim 1, wherein said forming the axle journal includes configuring the connecting section to have a diagonal surface which faces the mid-section of the axle tube when the outer surface of the connecting section is engaged to the inner surface of the end portion of the axle tube, and further comprising providing the clamping piece with a wedge shape having a diagonal surface engaging the diagonal surface of the connecting section.

7. The method according to claim 1, wherein
said forming the axle journal includes configuring the connecting section to have at least one expansion slot which extends substantially parallel to a longitudinal axis of the axle journal and opens at an end closest to the mid-section of the axle tube when the outer surface of the connecting section is engaged to the inner surface of the end portion of the axle tube.

8. The method according to claim 7, wherein
said forming the axle journal includes further configuring the connecting section such that the at least one expansion slot tapers along the longitudinal axis of the axle journal and opens towards the mid-section of the axle tube.

9. The method according to claim 8,
further comprising providing the clamping piece with four arms engaging four tapered slots on the connecting section.

10. The method according to claim 9, wherein
said providing the clamping piece comprises providing the arms such that the arms define a cylindrical shape which is complementary to the inner cylindrical surface of the axle tube thereby allowing the clamping piece to be guided by the axle tube.

11. The method according to claim 1, wherein
said using the bolt to adjust the clamping piece comprises rotating the bolt relative to the axle journal, further comprising providing the bolt with a threaded section engaging a threaded section of the clamping piece.

12. The method according to claim 1, wherein
said forming the axle tube includes reinforcing the axle tube where the connecting section is to be radially braced against the end portion.

13. A wheel bearing assembly for vehicles, comprising:
an axle tube having a first end and a mid-section, the first end including an end portion with an inner cylindrical surface;
an axle journal having a connecting section with an outer cylindrical surface, the connecting section being engaged to the inner cylindrical surface of the end portion of the axle tube, the axle journal being configured to receive a wheel hub for rotation thereon;
a clamping piece configured to cooperate with the connecting section of the axle journal;
a bolt engaged with the clamping piece, the bolt being operable to axially move the clamping piece relative to the end portion of the axle tube and the connecting section to radially brace the connecting section of the axle journal against the end portion of the axle tube; and
a brake anchor plate mounted to the axle tube at the first end thereof, the connecting section being radially braced against the axle journal at a position between the brake anchor plate and the mid-section of the axle tube.

14. The wheel bearing assembly according to claim 13, wherein
the axle journal and connecting section form an integrated, one-piece unit.

15. The wheel bearing assembly according to claim 13, wherein
the inner surface of the end portion of the axle tube defines a circular cylinder having a uniform cross-section along the longitudinal axis thereof.

16. The wheel bearing assembly according to claim 15, wherein
the outer surface of the connecting section defines a circular cylinder having a uniform cross-section along the longitudinal axis thereof.

17. The wheel bearing assembly according to claim 13, wherein
the connecting section of the axle journal has an inner conical surface which opens towards the mid-section of the axle tube and the clamping piece has an outer conical surface which engages the inner conical surface of the connecting section.

18. The wheel bearing assembly according to claim 13, wherein the connecting section of the axle journal has a diagonal surface facing the mid-section of the axle tube and the clamping piece has a wedge shape with a diagonal surface which engages the diagonal surface of the connecting section.

* * * * *